United States Patent
Wu et al.

(10) Patent No.: US 10,780,998 B1
(45) Date of Patent: Sep. 22, 2020

(54) SPACECRAFT DESIGN WITH MULTIPLE THERMAL ZONES

(71) Applicant: Space Systems/Loral, LLC, Palo Alto, CA (US)

(72) Inventors: Gordon Wu, Sunnyvale, CA (US); Timothy Lofquist, Sunnyvale, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 498 days.

(21) Appl. No.: 15/466,610

(22) Filed: Mar. 22, 2017

(51) Int. Cl.
*B64G 1/58* (2006.01)

(52) U.S. Cl.
CPC ........................................ *B64G 1/58* (2013.01)

(58) Field of Classification Search
CPC . B64G 1/58; B64G 1/50; B64G 1/503; B64G 1/506; H05K 7/2039; H05K 7/20409; H05K 7/20418; H05K 7/20518; H05K 1/0203
See application file for complete search history.

(56) References Cited

U.S. PATENT DOCUMENTS

| | | | | |
|---|---|---|---|---|
| 4,465,392 A | * | 8/1984 | Lang | F16C 7/026 403/24 |
| 4,738,304 A | | 4/1988 | Chalmers et al. | |
| 4,880,050 A | * | 11/1989 | Nakamura | B64G 1/50 165/41 |
| 5,332,030 A | * | 7/1994 | Spencer | B64G 1/50 165/274 |
| 5,494,241 A | * | 2/1996 | Poulain | B64G 1/503 165/41 |

(Continued)

FOREIGN PATENT DOCUMENTS

| | | |
|---|---|---|
| FR | 2840881 A1 | 12/2003 |
| FR | 3052443 A1 * | 12/2017 ............. B64G 1/503 |

(Continued)

OTHER PUBLICATIONS

Daniel, "Space is really, really big—except sometimes it isn't" post in Mars Express blog, http://blogs.esa.int/mex/2014/02/21/space-is-really-really-big-except-sometimes-it-isnt/, posted on Feb. 21, 2014; accessed Apr. 9, 2019 (Year: 2014).*

(Continued)

*Primary Examiner* — Philip J Bonzell
(74) *Attorney, Agent, or Firm* — Weaver Austin Villeneuve & Sampson LLP (57) ABSTRACT

A spacecraft includes a body, a plurality of separate units, and a first auxiliary radiator panel. The body includes a plurality of sidewalls, at least a first sidewall of the plurality of sidewalls including an outboard-facing radiator surface having optical solar reflectors disposed thereon. A first subset of the plurality of units is thermally coupled with the outboard-facing radiator surface of the first sidewall. A second subset of the plurality of units is thermally coupled with the first auxiliary radiator panel and is isolated from at least conductive thermal heat transfer with the outboard-facing radiator surface of the first sidewall. The first subset of units is spatially proximate to the second subset of units and is configured to operate in a first temperature range. The second subset of units is configured to operate in a second temperature range, the second temperature range being different from the first temperature range.

18 Claims, 5 Drawing Sheets

(56) References Cited

U.S. PATENT DOCUMENTS

| | | | | |
|---|---|---|---|---|
| 5,608,414 | A * | 3/1997 | Amore | B64G 1/22 343/700 MS |
| 5,735,489 | A * | 4/1998 | Drolen | B64G 1/50 244/171.8 |
| 5,839,696 | A * | 11/1998 | Caplin | B64G 1/10 244/159.4 |
| 5,884,868 | A * | 3/1999 | Long | B64G 1/226 244/171.8 |
| 5,897,080 | A * | 4/1999 | Barrett | B64G 1/22 244/171.7 |
| 6,005,184 | A * | 12/1999 | Barnes | H01L 31/048 136/244 |
| 6,005,771 | A * | 12/1999 | Bjorndahl | H01L 23/427 165/185 |
| 6,065,529 | A * | 5/2000 | Antoniuk | B64G 1/50 165/104.26 |
| 6,080,962 | A * | 6/2000 | Lee | B64G 1/10 165/41 |
| 6,196,501 | B1 * | 3/2001 | Hall | B64G 1/222 244/171.7 |
| 6,207,315 | B1 * | 3/2001 | Gelon | B64G 1/425 244/171.7 |
| 6,923,249 | B1 * | 8/2005 | Porter | B64G 1/425 136/246 |
| 7,191,984 | B2 | 3/2007 | Barton et al. | |
| 7,762,499 | B1 * | 7/2010 | Hentosh | B64G 1/50 165/41 |
| 8,616,271 | B2 | 12/2013 | Hugon et al. | |
| 8,820,684 | B2 | 9/2014 | McKinnon et al. | |
| 9,828,116 | B1 * | 11/2017 | Mena | B64G 1/50 |
| 2003/0196778 | A1 * | 10/2003 | Kobayashi | B64G 1/503 165/41 |
| 2009/0308022 | A1 * | 12/2009 | Kiskiras | B64C 1/40 52/794.1 |
| 2010/0251653 | A1 * | 10/2010 | Mills | B64G 1/50 52/506.05 |
| 2011/0001013 | A1 * | 1/2011 | Torres Sepulveda | B64G 1/50 244/171.8 |
| 2012/0125571 | A1 * | 5/2012 | Lutz | B64G 1/503 165/104.21 |
| 2013/0168057 | A1 * | 7/2013 | Semenic | F28D 15/0233 165/104.26 |
| 2014/0110531 | A1 * | 4/2014 | Aston | B64G 1/50 244/171.8 |
| 2015/0069187 | A1 * | 3/2015 | McKinnon | B64G 1/50 244/171.8 |
| 2016/0288926 | A1 * | 10/2016 | Smith | B64G 1/503 |
| 2018/0079534 | A1 * | 3/2018 | Walker | B64G 1/10 |
| 2018/0265226 | A1 * | 9/2018 | Mena | B64G 1/506 |

FOREIGN PATENT DOCUMENTS

| | | | |
|---|---|---|---|
| GB | 2369882 A | 6/2002 | |
| WO | WO-2016193618 A1 * | 12/2016 | B64G 1/10 |

OTHER PUBLICATIONS

Wikipedia, Multi-layer insulation; https://en.wikipedia.org/wiki/Multi-layer insulation; archived by Internet Archive on Mar 3, 2015; https://web.archive.org/web/20150303172822/https://en.wikipedia.org/wiki/Multi-layer_insulation; accessed Apr. 10, 2019 (Year: 2015).*

Wikipedia, "Optical solar reflector", last edited Jan. 23, 2017, https://en.wikipedia.org/wiki/Optical_solar_reflector; accessed Jun. 12, 2019 (Year: 2017).*

ESA, Cluster Engineering Thermal Control webpage, last update Mar. 16, 2006, http://sci.esa.int/cluster/1985-engineering/?fbodylongid=758; accessed Jun. 12, 2019 (Year: 2006).*

* cited by examiner

SPACECRAFT DESIGN WITH MULTIPLE THERMAL ZONES

TECHNICAL FIELD

This invention relates generally to radiators of a spacecraft, and more particularly to techniques for arranging radiators of a spacecraft to create thermally separated zones.

BACKGROUND

The assignee of the present invention designs and manufactures spacecraft for, inter alia, communications and broadcast services from geosynchronous orbit. The payload capacity of such a spacecraft may be limited by the capability of the spacecraft to reject excess heat. In the vacuum of space, heat rejection is achievable by thermal radiation. Therefore, such a spacecraft typically includes an arrangement of externally facing radiator panels that radiate excess heat from units of the spacecraft into space. Not all of the units are normally configured to operate at the same temperature. For example, low noise amplifiers (LNAs) are preferably operated at a cooler temperature range than traveling-wave tube amplifier (TWTAs). In the absence of the present teachings, the LNA's may be located in a different thermal zone than the TWTAs and at a considerable lateral distance from each other. For instance, referring to the conventional radiator arrangement 100 depicted in FIG. 1, first units 115 are coupled with a main radiator panel 110, which is laterally separated from an auxiliary radiator panel 120. The auxiliary radiator panel 120 is coupled with a second unit 125, which operates in a different temperature range from the first units 115. Thus, in the absence of the presently disclosed techniques, units with different operating temperature requirements must generally be laterally separated. Such lateral separation puts constraints on panel layout, causing a variety of difficulties. By way of example, where LNAs are required to be disposed in a laterally separated, relatively cold thermal zone they may necessarily be a considerable distance from their associated down converters, resulting in longer waveguide or coax runs, more mass, and/or higher back end noise. Similarly, TWTAs that may be operable in a relatively hot thermal zone may necessarily be a considerable distance from their associated Electronic Power Conditioners (EPCs) and Channel Amplifiers (CAMPs) that are operable only in a relatively cool thermal zone. As a result undesirably long EPC cables and coax runs from CAMPs to TWTAs may be required, thereby increasing the mass of the spacecraft.

Accordingly, improved techniques for arranging radiators of a spacecraft to create thermally separated zones are desirable.

SUMMARY

The systems, apparatuses, and spacecraft disclosed herein have several innovative aspects, no single one of which is solely responsible for the desirable attributes disclosed herein.

One innovative aspect of the subject matter described in this disclosure can be implemented in a spacecraft comprising a body including a plurality of sidewalls, at least a first sidewall of the plurality of sidewalls including an outboard-facing radiator surface, a plurality of units, and a first auxiliary radiator panel. The first auxiliary radiator panel may be disposed outboard of the first sidewall. A first subset of the plurality of units may be thermally coupled with the outboard-facing radiator surface of the first sidewall. A second subset of the plurality of units may be thermally coupled with the first auxiliary radiator panel and thermally isolated from the outboard-facing radiator surface of the first sidewall.

In some implementations, the first subset of units may be spatially proximate to the second subset of units. The first subset of units may be configured to operate in a first temperature range. The second subset of units may be configured to operate in a second temperature range, the second temperature range may be different from the first temperature range.

In some implementations, the spacecraft may further comprise a second auxiliary radiator panel. A third subset of the plurality of units may be thermally coupled with the second auxiliary radiator panel and thermally isolated from the outboard-facing radiator surface of the first sidewall. The third subset of units may be configured to operate in a third temperature range. The second auxiliary radiator panel may be thermally de-coupled from the first auxiliary radiator panel. The third temperature range may be different than the first temperature range. In some implementations, the first temperature range may be colder than the second temperature range, and the third temperature range may be hotter than the second temperature range.

In some implementations, the spacecraft may further comprise multi-layer insulation (MLI) positioned between the outboard-facing radiator surface of the first sidewall and the first auxiliary radiator panel and an insulating washer supporting the first auxiliary radiator panel. The second subset of units may be positioned within a cutout of the outboard-facing radiator surface of the first sidewall.

In some implementations, the spacecraft may further comprise a heat pipe network configured to spread heat across the outboard-facing radiator surface of the first sidewall. The first auxiliary radiator panel may include an internal heat transfer mechanism including one or both of: embedded heatpipes or spreader heatsinks.

In some implementations, the plurality of units may include a low noise amplifier (LNA), a traveling-wave tube amplifier (TWTA), an electronic power conditioner (EPC), a channel amplifier (CAMP), and/or an output multiplexer (OMUX).

Another innovative aspect of the subject matter described in this disclosure can be implemented in an apparatus comprising a radiator surface configured to be included on an outboard-facing side of a sidewall of a body of a spacecraft, a plurality of units; and a first auxiliary radiator panel. The first auxiliary radiator panel may be configured to be disposed outboard of the sidewall. A first subset of the plurality of units may be configured to be thermally coupled with the radiator surface configured to be included on the outboard-facing side of the sidewall. A second subset of the plurality of units may be configured to be thermally coupled with the first auxiliary radiator panel and thermally isolated from the radiator surface configured to be included on the outboard-facing side of the sidewall.

In some implementations, the first subset of units may be spatially proximate to the second subset of units. The first subset of units may be configured to operate in a first temperature range. The second subset of units may be configured to operate in a second temperature range, the second temperature range may be different from the first temperature range.

In some implementations, the apparatus may further comprise a third subset of the plurality of units configured to be thermally coupled with a second auxiliary radiator panel and thermally isolated from the radiator surface configured to be included on the outboard-facing side of the sidewall. The third subset of units may be configured to operate in a third temperature range. The second auxiliary radiator panel may be thermally de-coupled from the first auxiliary radiator panel. The first temperature range may be colder than the second temperature range. The third temperature range may be hotter than the second temperature range.

In some implementations, the apparatus may further comprise multi-layer insulation (MLI) positioned between the radiator surface configured to be included on the outboard-facing side of the sidewall and the first auxiliary radiator panel and an insulating washer supporting the first auxiliary radiator panel. The second subset of units may be positioned within a cutout of the radiator surface.

In some implementations, the apparatus may further comprise a heat pipe network configured to spread heat across the radiator surface configured to be included on the outboard-facing side of the sidewall.

In some implementations, the plurality of units may include a low noise amplifier (LNA), a traveling-wave tube amplifier (TWTA), an electronic power conditioner (EPC), a channel amplifier (CAMP), and/or an output multiplexer (OMUX).

Another innovative aspect of the subject matter described in this disclosure can be implemented in a spacecraft comprising a body including a plurality of sidewalls, at least a first sidewall of the plurality of sidewalls including an outboard-facing radiator surface, a plurality of units, a first auxiliary radiator panel, and a second auxiliary radiator panel. The first auxiliary radiator panel may be disposed outboard of the first sidewall. The second auxiliary radiator panel may be disposed outboard of the first sidewall. A first subset of the plurality of units may be thermally coupled with the outboard-facing radiator surface of the first sidewall. A second subset of the plurality of units may be thermally coupled with the first auxiliary radiator panel and thermally isolated from the outboard-facing radiator surface of the first sidewall. A third subset of the plurality of units may be thermally coupled with the second auxiliary radiator panel and thermally isolated from the outboard-facing radiator surface of the first sidewall and from the first auxiliary radiator panel.

In some implementations, the first subset of units may be spatially proximate to the second subset of units. The first subset of units may be configured to operate in a first temperature range. The second subset of units may be configured to operate in a second temperature range. The third subset of units may be configured to operate in a third temperature range. The first temperature range may be colder than the second temperature range. The third temperature range may be hotter than the second temperature range.

In some implementations, the spacecraft may further comprise multi-layer insulation (MLI) positioned between the outboard-facing radiator surface of the first sidewall and the first auxiliary radiator panel and an insulating washer supporting the first auxiliary radiator panel. The second subset of units may be positioned within a cutout of the outboard-facing radiator surface of the first sidewall.

In some implementations, the spacecraft may further comprise a heat pipe network configured to spread heat across the outboard-facing radiator surface of the first sidewall. The first and/or second auxiliary radiator panels may include an internal heat transfer mechanism including one or both of: embedded heatpipes or spreader heatsinks.

In some implementations, the plurality of units may include a low noise amplifier (LNA), a traveling-wave tube amplifier (TWTA), an electronic power conditioner (EPC), a channel amplifier (CAMP), and/or an output multiplexer (OMUX).

BRIEF DESCRIPTION OF THE DRAWINGS

Features of the invention are more fully disclosed in the following detailed description of the preferred embodiments, reference being had to the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "I" is also used as a shorthand notation for "and/or".

The terms "spacecraft", "satellite" and "vehicle" may be used interchangeably herein, and generally refer to any orbiting satellite or spacecraft system.

The phrase "substantially parallel" as used herein, unless otherwise expressly indicated, refers to a relationship in which a plane or generally flat part or surface is either parallel to, or at a minimum angle close to 0° with respect to, a reference axis. A plane which is substantially parallel to an axis may be, for example, at as much as approximately an 10° maximum angle with respect to the axis and still be considered to be substantially parallel. The terms "parallel" and "substantially parallel" may be used interchangeably herein.

Embodiments disclosed hereinbelow include significant improvements to a spacecraft radiator arrangement. As described above, in the absence of the presently disclosed techniques, units with different operating temperature requirements must generally be laterally separated. As a result, equipment having different operating temperatures may be inefficiently arranged requiring longer connections, which may introduce both noise and excess mass.

The presently disclosed techniques, on the other hand, allow for units with different operating temperature requirements to be placed in close spatial proximity.

Figure 2:
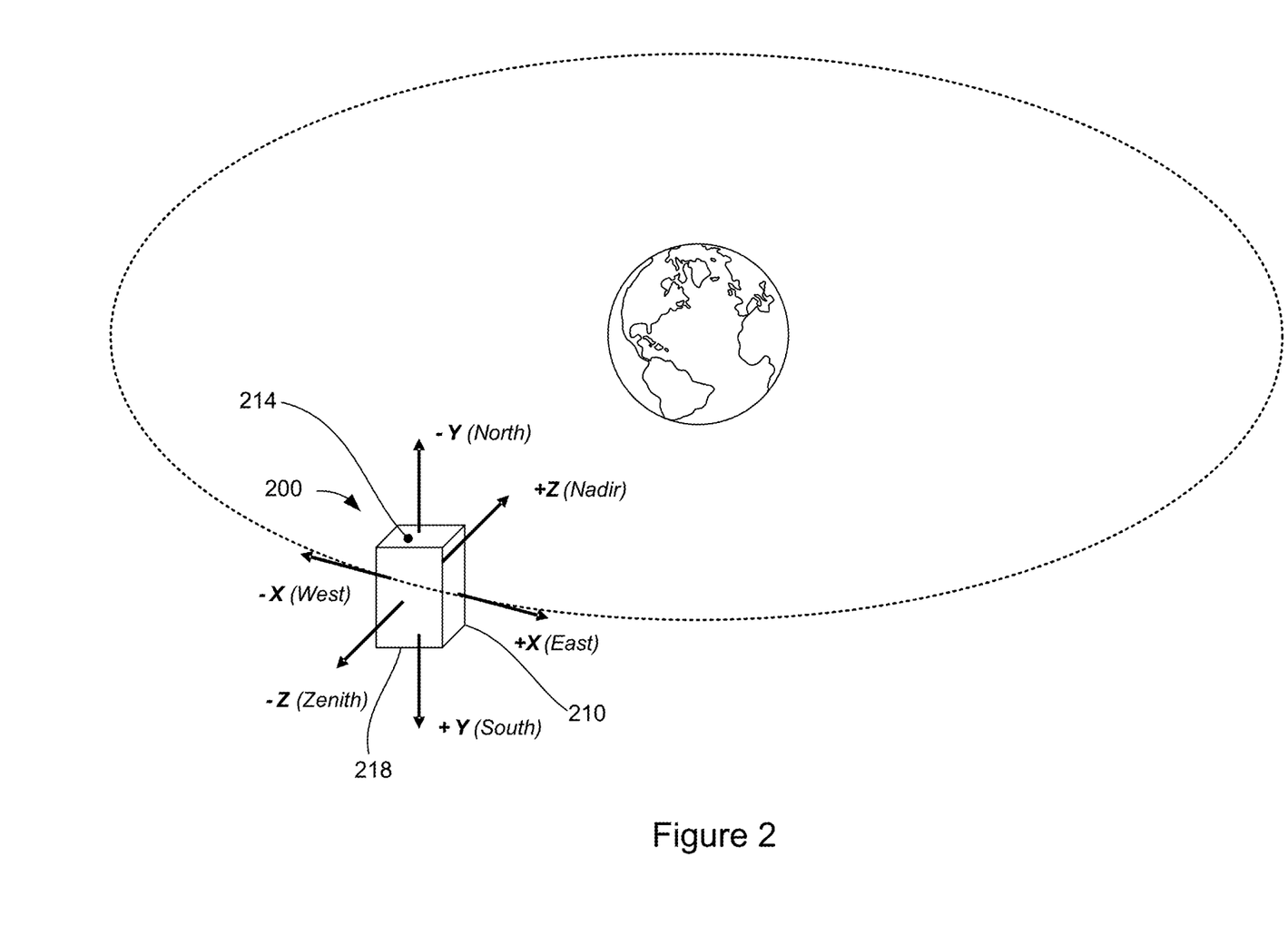
FIG. 2 illustrates a simplified diagram of an example of a spacecraft orbiting Earth, in accordance with some implementations.

The arrangements disclosed herein may be implemented in spacecraft configured to operate in a variety of orbits. Where, as illustrated in FIG. 2, a 3-axis stabilized spacecraft 200 disposed in a near equatorial orbit (i.e., with less than 45 degree inclination to the equator), the spacecraft 200 may be regarded as including a main body 210 enclosed by sidewalls facing, respectively in a generally north, south, east, west, Earth (nadir) and anti-Earth (zenith) direction. When the spacecraft 200 is operating on-orbit, radiators may generally be disposed on the north-facing sidewall 214 or the south-facing sidewall 218. While radiators may be disposed on any sidewall of the spacecraft 200, by orienting a radiator to face north (or south) the radiator has limited exposure to the Sun and may efficiently radiate heat into space.

Figure 3:
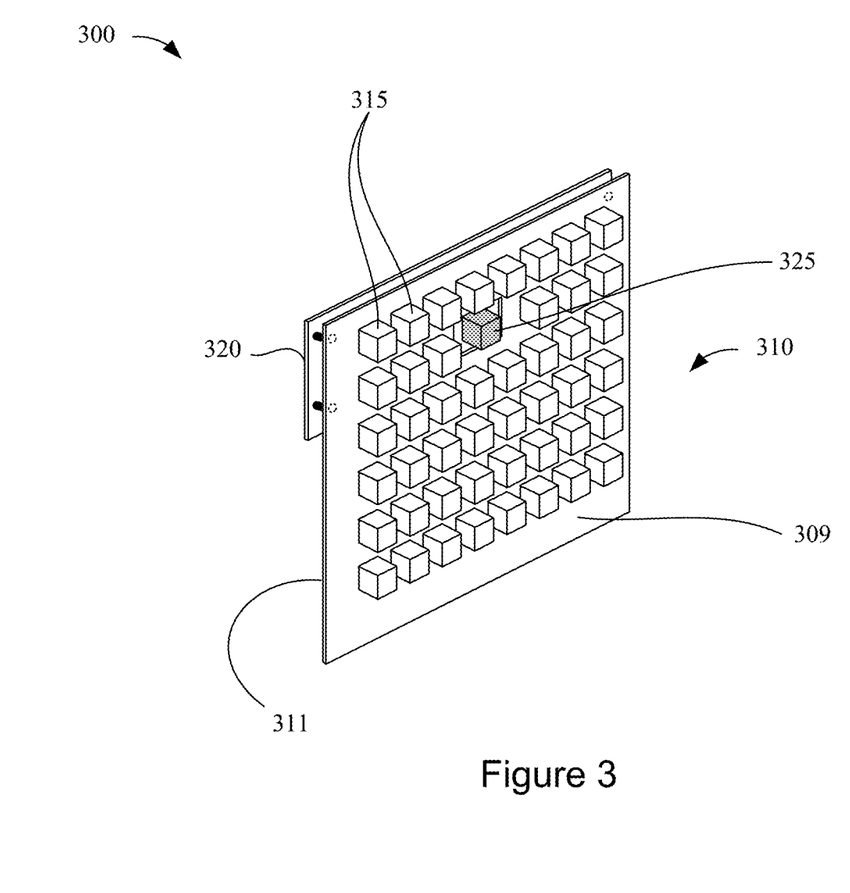
FIG. 3 illustrates an example of an isometric view of a radiator arrangement of a spacecraft, in accordance with some implementations.

The presently disclosed techniques enable equipment with different operating temperature requirements to be placed within close spatial proximity of each other. The equipment may include heat dissipating units (e.g., TWTAs, EPCs, CAMPs, LNAs, etc.) and/or non-heat dissipating units (e.g., passive input filters, radio frequency (RF) filters, batteries, propulsion management subsystems, etc.) of a spacecraft. For instance, FIG. 3 depicts an example of an isometric view of an equipment mounting arrangement 300 of a spacecraft, in accordance with some implementations. The arrangement 300 may be included in a first sidewall of a spacecraft. By way of example, as discussed above, the arrangement 300 may be included the north-facing sidewall 214 or south-facing sidewall 218 of the spacecraft 200 of FIG. 2. In the illustrated implementation, the arrangement 300 includes a primary equipment mounting panel 310. The primary equipment mounting panel 310 includes an inboard-facing surface 309 on which equipment including units 315 are disposed. The primary equipment mounting panel 310 also includes an outboard-facing surface 311. The outboard-facing surface 311 may be configured to increase heat dissipation and/or reflect solar radiation. For example, the outboard-facing surface may include optical solar reflectors. The arrangement 300 of FIG. 3 also includes a first auxiliary radiator panel 320, which is disposed outboard of the first sidewall of the spacecraft.

The arrangement 300 includes units with various operating temperature ranges. For example, the arrangement 300 includes a first subset of units 315 (white) and a second subset of units 325 (grey). The first subset of units 315 are thermally coupled with the outboard-facing surface 311. The first subset of units 315 may operate in a first temperature range. The second subset of units 325 is thermally coupled with the first auxiliary radiator panel 320. The second subset of units 325 may operate in a second temperature range different from (either hotter or colder than) the first temperature range.

Figure 4:
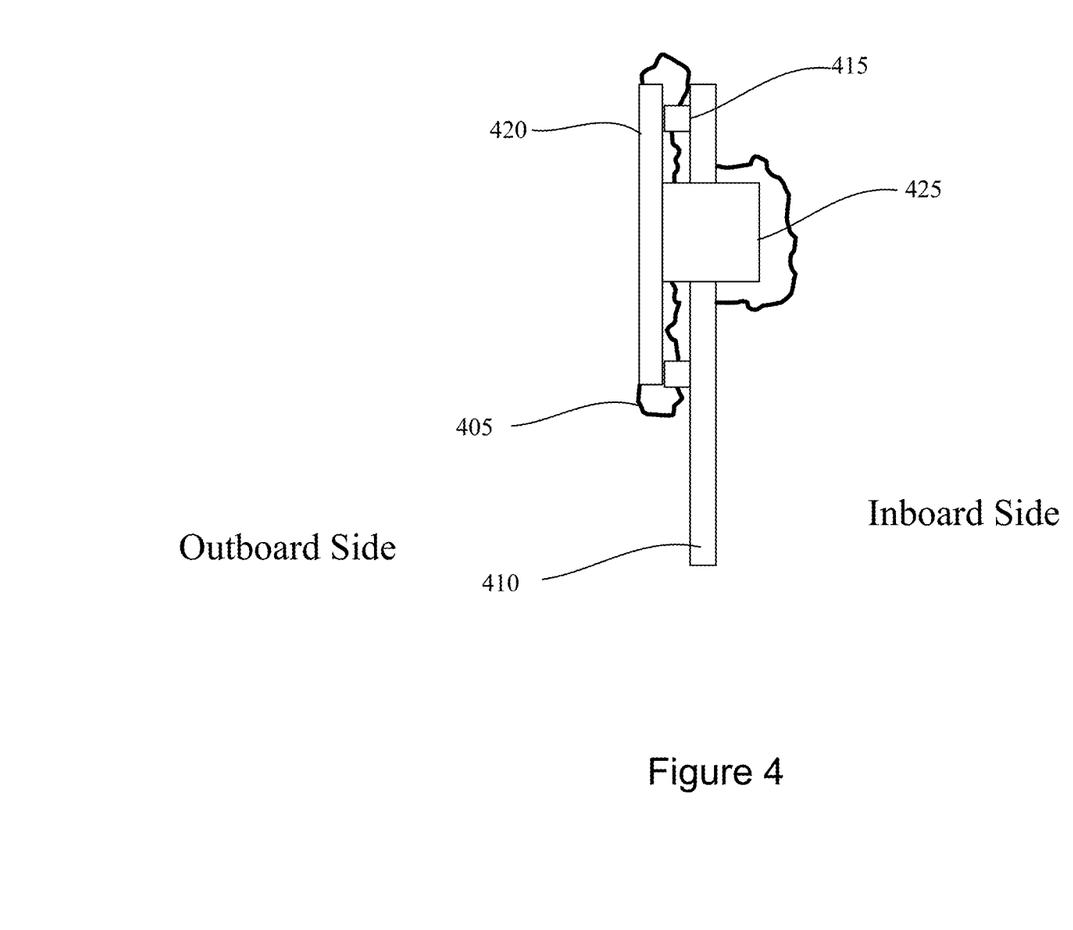
FIG. 4 illustrates a cross-sectional view of a portion of a radiator arrangement of a spacecraft, in accordance with some implementations.

Notably, as described below in the context of FIG. 4, the system of the outboard-facing surface 311 and the system of the first auxiliary radiator panel 320 may be thermally isolated from each other such that the first subset of units 315 and the second subset of units 325 may be spatially proximate to each other, even though they operate in different temperature ranges. In other words, in contrast to the prior art arrangement 100 depicted in FIG. 1 in which the auxiliary radiator 120 panel and main radiator panel 110 do not overlap, the first auxiliary radiator panel 320 of FIG. 3 is disposed outboard of the outboard-facing surface 311 such that the surface area of the auxiliary radiator panel 320 is substantially parallel to outboard-facing surface 311 such that it has a projection onto the plane of the outboard-facing surface 311 that overlaps with a portion of the surface area of the outboard-facing surface 311. As such, unlike the units 115 and 125 depicted in FIG. 1, the first subset of units 315 of FIG. 3 may be placed in close spatial proximity to the second subset of units 325 even though the first subset of units 315 and the second subset of units 325 operate in different temperature ranges. By way of illustration, the second subset of units 325 may include an EPC, which may be placed within approximately 2-20 inches of an adjacent TWTA of first subset of units 315. By contrast, in conventional radiator arrangement, such as arrangement 100 of FIG. 1, units with different operating temperature requirements, such as a CAMP and a EPC, may be placed as far apart as 40-80 inches.

As discussed above, thermal isolation between auxiliary radiator systems and main radiator systems may be achieved using the disclosed techniques. For example, FIG. 4 depicts a cross-sectional view of a portion of a radiator arrangement of a spacecraft, in accordance with some implementations. In FIG. 4, multi-layer insulation (MLI) 405 is positioned between a main radiator panel 410 and an auxiliary radiator panel 420 to thermally decouple the main radiator panel 410 and the auxiliary radiator panel 420. Unit 425, which is positioned within a cutout of the main radiator panel 410, may be thermally coupled to the auxiliary radiator panel 420.

In the illustrated implementations, an insulating washer 415 may provide structural support and further insulation between the main radiator panel 410 and the auxiliary radiator panel 420. As described above, such thermal isolation allows the main radiator panel 410 and the auxiliary radiator panel 420 to operate at different temperatures.

The thermal isolation techniques described above in the context of FIG. 4 may be applied to any radiator arrangement disclosed herein. By way of example, in some implementations, the main radiator panel 410 of FIG. 4 may be the outboard-facing surface 311 of FIG. 3, the auxiliary radiator panel 420 of FIG. 4 may be the auxiliary radiator panel 320 of FIG. 3, and the unit 425 of FIG. 4 may be the second subset of units 325 of FIG. 3.

Figure 5:
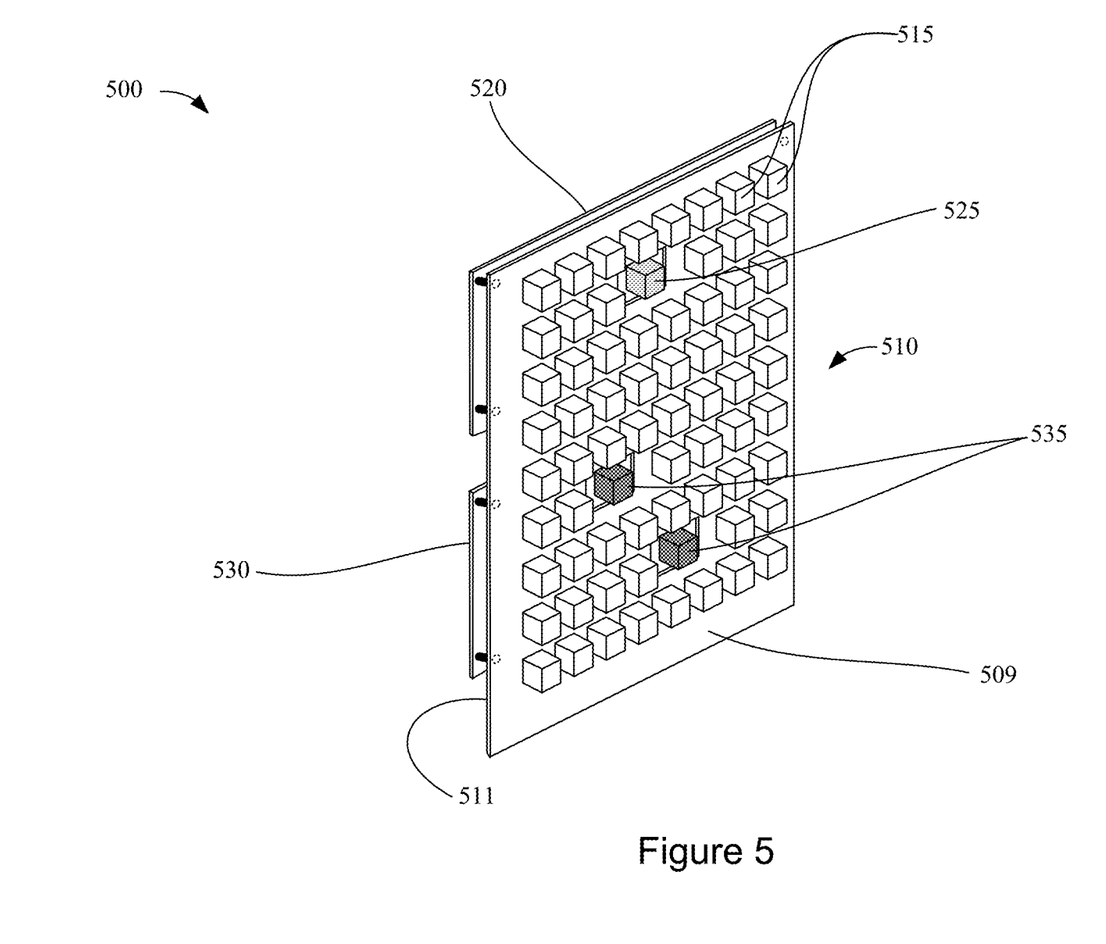
FIG. 5 illustrates an example of an isometric view of a radiator arrangement of a spacecraft, in accordance with some implementations.

The disclosed approach may be used to create more than two thermal zones in close spatial proximity. For instance, FIG. 5 depicts an example of an isometric view of an equipment mounting arrangement 500 of a spacecraft, in accordance with some implementations. The arrangement 500 may be included in a first sidewall of a spacecraft. By way of example, as discussed above, the arrangement 500 may be included the north-facing sidewall 214 or south-facing sidewall 218 of the spacecraft 200 of FIG. 2. In the illustrated implementation, the arrangement 500 includes a primary equipment mounting panel 510. The primary equipment mounting panel 510 includes an inboard-facing surface 509 on which equipment including units 515 are disposed. The primary equipment mounting panel 510 also includes an outboard-facing surface 511. The outboard-facing surface 511 may be configured to increase heat dissipation and/or reflect solar radiation. For example, the outboard-facing surface may include optical solar reflectors. Arrangement 500 of FIG. 5 includes a first auxiliary radiator panel 520, that is disposed outboard of the first sidewall. Arrangement 500 also includes a second auxiliary radiator panel 530, that is disposed outboard of the first sidewall.

Arrangement 500 includes units with various operating temperature ranges. For example, the arrangement 500 includes a first subset of units 515 (white), a second subset of units 525 (light grey), and a third subset of units 535 (dark grey). The first subset of units 515 are thermally coupled with the outboard-facing surface 511 of the first sidewall. The first subset of units 515 may operate in a first temperature range. The second subset of units 525 is thermally coupled with the first auxiliary radiator panel 520. The second subset of units 525 may operate in a second temperature range different from (either hotter or colder than) the first temperature range. The third subset of units 535 are thermally coupled with the second auxiliary radiator panel 530. The third subset of units 535 may operate in a third temperature range different from (either hotter or colder than) the first and second temperature ranges.

As described above in the context of FIG. 4, the system of the outboard-facing surface 511 of FIG. 5, the system of the first auxiliary radiator panel 520, and the system of the second auxiliary radiator panel 530 are thermally isolated from each other such that the first subset of units 515, the second subset of units 525, and the third subset of units 535 operate simultaneously in their respective temperature ranges.

One having skill in the art may appreciate that the techniques described above may be implemented to create any number of thermal zones having any suitable temperature ranges. By way of example, an outboard-facing surface of a spacecraft may have any arbitrary number N cutouts, each cutout containing at least one unit, as described above. The spacecraft may have any arbitrary number M auxiliary radiator panels thermally coupled with one or more of the units described in the preceding sentence. Each of the M auxiliary radiator panels may be thermally isolated from each other, as well as from the outboard-facing radiator surface, using the techniques described above.

In some implementations, a main radiator panel, e.g., outboard-facing surface 311 of FIG. 3 and/or outboard-facing surface 511 of FIG. 5, may include a heatpipe network configured to spread heat across the main radiator panel. The heatpipes of such a heatpipe network may be positioned to allow flexible mounting of equipment. By way of example, the heatpipes (not shown) of the outboard-facing surface 311 of FIG. 3 may be arranged around the cutout containing the second subset of units 325 such that no heatpipes of the network intersect with the edges of the cutout. Also or alternatively, an auxiliary radiator panel, e.g., the first auxiliary radiator panel 320 of FIG. 3, the first auxiliary radiator panel 520 and/or the second auxiliary radiator panel 530 of FIG. 5, include may include an internal heat transfer mechanism such as embedded heatpipes and/or spreader heatsinks.

Figure 1:
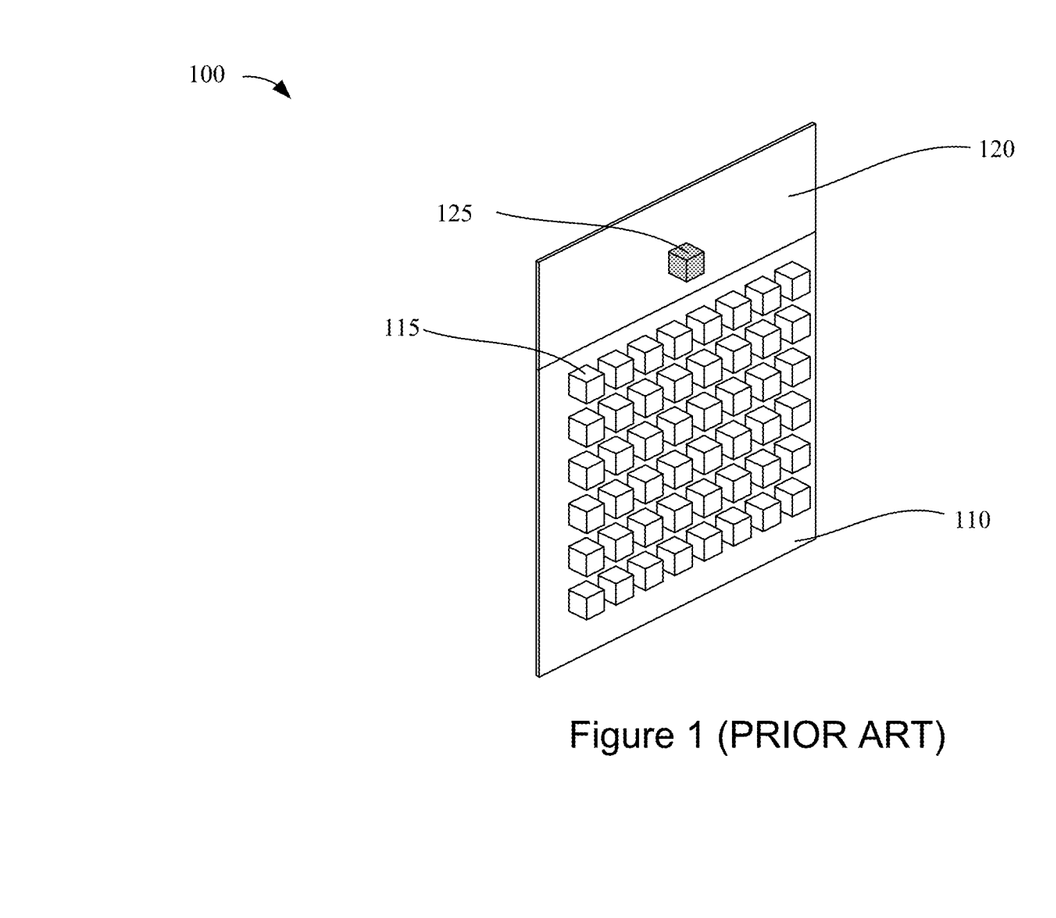
FIG. 1 illustrates an example of an isometric view of a conventional radiator arrangement of the prior art.

The approach disclosed herein may have a variety of quantifiable benefits when compared to spacecraft implementing prior art solutions such as the arrangement 100 depicted in FIG. 1. For example, using the disclosed techniques to place LNAs in thermally isolated cold zones, which are in close spatial proximity to down converters, may improve gain to noise by as much as 0.2-0.4 dB. Additionally such an arrangement obviates the need for a separately supported dedicated LNA radiator panel, potentially leading to a mass reduction on the order of 10 or more kilograms. Also or alternatively, placing output multiplexers (OMUX) and TWTAs in hot zones that are thermally isolated using the techniques described above may lead to significant improvements in thermal capacity.

Referring again to FIGS. 3-5, it will be appreciated that the arrangements disclosed herein, advantageously, allow for units with different operating temperature requirements to be placed in close spatial proximity. As a result, spacecraft including such arrangements have been shown to suffer less noise and reduced mass as compared to similar spacecraft having conventional radiator arrangements such as arrangement 100 of FIG. 1.

Thus, an improved radiator arrangement has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
a body including a plurality of sidewalls, at least a first sidewall of the plurality of sidewalls including an outboard-facing radiator surface having optical solar reflectors disposed thereon;
a plurality of separate units; and
a first auxiliary radiator panel; wherein
the first auxiliary radiator panel is disposed outboard of the first sidewall;
a first subset of the plurality of units is thermally coupled with the outboard-facing radiator surface of the first sidewall so as to dissipate heat by way of the optical solar reflectors;
a second subset of the plurality of units is thermally coupled with the first auxiliary radiator panel from the outboard-facing radiator surface of the first sidewall;
the first subset of units is spatially proximate to the second subset of units;
the first subset of units is configured to operate in a first temperature range; and
the second subset of units is isolated from at least conductive thermal heat transfer with the outboard-facing radiator surface of the first sidewall and is configured to operate in a second temperature range, the second temperature range being different from the first temperature range.

2. The spacecraft of claim 1, wherein the plurality of units includes a low noise amplifier (LNA), a traveling-wave tube amplifier (TWTA), an electronic power conditioner (EPC), a channel amplifier (CAMP), and/or an output multiplexer (OMUX).

3. The spacecraft of claim 1, further comprising a second auxiliary radiator panel; wherein:
a third subset of the plurality of units is thermally coupled with the second auxiliary radiator panel and is isolated from at least conductive thermal heat transfer with the outboard-facing radiator surface of the first sidewall, the third subset of units being configured to operate in a third temperature range, the second auxiliary radiator panel is isolated from at least conductive thermal heat transfer with the first auxiliary radiator panel, and the third temperature range is different than the first temperature range.

4. The spacecraft of claim 3, wherein:

the first temperature range is colder than the second temperature range, and the third temperature range is hotter than the second temperature range.

5. The spacecraft of claim 1, further comprising:

multi-layer insulation (Mil) positioned between the outboard-facing radiator surface of the first sidewall and the first auxiliary radiator panel; and an insulating washer supporting the first auxiliary radiator panel; wherein the second subset of units is positioned within a cutout of the outboard-facing radiator surface of the first sidewall.

6. The spacecraft of claim 5, further comprising:

a heat pipe network configured to spread heat across the outboard-facing radiator surface of the first sidewall.

7. The spacecraft of claim 6, wherein the first auxiliary radiator panel includes an internal heat transfer mechanism including one or both of: embedded heatpipes or spreader heatsinks.

8. An apparatus comprising:

a radiator surface included on an outboard-facing side of a sidewall of a body of a spacecraft and having optical solar reflectors disposed thereon;

a plurality of separate units; and a first auxiliary radiator panel; wherein the first auxiliary radiator panel is disposed outboard of the sidewall;

a first subset of the plurality of units is thermally coupled with the radiator surface so as to dissipate heat by way of the optical solar reflectors;

a second subset of the plurality of units is thermally coupled with the first auxiliary radiator panel and is isolated from at least conductive thermal heat transfer with the radiator surface;

the first subset of units is spatially proximate to the second subset of units;

the first subset of units is configured to operate in a first temperature range; and the second subset of units is configured to operate in a second temperature range, the second temperature range being different from the first temperature range.

9. The apparatus of claim 8, further comprising:

a third subset of the plurality of units is thermally coupled with a second auxiliary radiator panel and is isolated from at least conductive thermal heat transfer with the radiator surface, the third subset of units being configured to operate in a third temperature range; wherein the second auxiliary radiator panel is is isolated from at least conductive thermal heat transfer with the first auxiliary radiator panel, the first temperature range is colder than the second temperature range, and the third temperature range is hotter than the second temperature range.

10. The apparatus of claim 8, wherein the plurality of units includes a low noise amplifier (LNA), a traveling-wave tube amplifier (TWTA), an electronic power conditioner (EPC), a channel amplifier (CAMP), and/or an output multiplexer (OMUX).

11. The apparatus of claim 8, further comprising:

multi-layer insulation (MLI) positioned between the radiator surface configured to be included on the outboard-facing side of the sidewall and the first auxiliary radiator panel; and an insulating washer supporting the first auxiliary radiator panel; wherein the second subset of units is positioned within a cutout of the radiator surface.

12. The apparatus of claim 11, further comprising:

a heat pipe network configured to spread heat across the radiator surface configured to be included on the outboard-facing side of the sidewall.

13. A spacecraft comprising:

a body including a plurality of sidewalls, at least a first sidewall of the plurality of sidewalls including an outboard-facing radiator surface having optical solar reflectors disposed thereon;

a plurality of separate units;

a first auxiliary radiator panel; and a second auxiliary radiator panel; wherein the first auxiliary radiator panel is disposed outboard of the first sidewall so as to dissipate heat by way of the optical solar reflectors;

the second auxiliary radiator panel is disposed outboard of the first sidewall;

a first subset of the plurality of units is thermally coupled with the outboard-facing radiator surface of the first sidewall;

a second subset of the plurality of units is thermally coupled with the first auxiliary radiator panel and is isolated from at least conductive thermal heat transfer with the outboard-facing radiator surface of the first sidewall; and a third subset of the plurality of units is thermally coupled with the second auxiliary radiator panel and is isolated from at least conductive thermal heat transfer with the outboard-facing radiator surface of the first sidewall and from the first auxiliary radiator panel;

the first subset of units is spatially proximate to the second subset of units;

the first subset of units is configured to operate in a first temperature range; and the second subset of units is configured to operate in a second temperature range, the second temperature range being different from the first temperature range.

14. The spacecraft of claim 13, wherein:

the third subset of units is configured to operate in a third temperature range;

the first temperature range is colder than the second temperature range; and the third temperature range is hotter than the second temperature range.

15. The spacecraft of claim 13, wherein the plurality of units includes a low noise amplifier (LNA), a traveling-wave tube amplifier (TWTA), an electronic power conditioner (EPC), a channel amplifier (CAMP), and/or an output multiplexer (OMUX).

16. The spacecraft of claim 13, further comprising:

multi-layer insulation (MLI) positioned between the outboard-facing radiator surface of the first sidewall and the first auxiliary radiator panel; and an insulating washer supporting the first auxiliary radiator panel; wherein the second subset of units is positioned within a cutout of the outboard-facing radiator surface of the first sidewall.

17. The spacecraft of claim 16, further comprising:

a heat pipe network configured to spread heat across the outboard-facing radiator surface of the first sidewall.

18. The spacecraft of claim 17, wherein the first and/or second auxiliary radiator panels includes an internal heat transfer mechanism including one or both of: embedded heatpipes or spreader heatsinks.

\* \* \* \* \*